(12) United States Patent
Okanishi et al.

(10) Patent No.: US 7,506,737 B2
(45) Date of Patent: Mar. 24, 2009

(54) MARINE REVERSING GEAR ASSEMBLY PROVIDED WITH LOCKING DEVICE

(75) Inventors: Toshiaki Okanishi, Amagasaki (JP); Shigeaki Nakagawa, Amagasaki (JP)

(73) Assignee: Kanzaki Kokyukoki Mfg. Co., Ltd., Hyogo-ken (JP)

( * ) Notice: Subject to any disclaimer, the term of this patent is extended or adjusted under 35 U.S.C. 154(b) by 387 days.

(21) Appl. No.: 11/330,096

(22) Filed: Jan. 12, 2006

(65) Prior Publication Data

US 2006/0157316 A1    Jul. 20, 2006

(30) Foreign Application Priority Data

Jan. 18, 2005    (JP)    ............... 2005-010649

(51) Int. Cl.
*B60W 10/02* (2006.01)
*B60W 10/18* (2006.01)

(52) U.S. Cl. ...................... 192/13 A; 440/74

(58) Field of Classification Search ............... 192/13 A; 440/74

See application file for complete search history.

(56) References Cited

U.S. PATENT DOCUMENTS

| | | | |
|---|---|---|---|
| 278,182 A * | 5/1883 | Reynolds | ................. 440/74 |
| 2,298,509 A * | 10/1942 | Phipps | ................. 192/219.1 |
| 2,963,115 A | 12/1960 | Peras | |
| 3,136,399 A | 6/1964 | Granryd | |
| 3,786,775 A * | 1/1974 | Sarns | ................. 440/74 |
| 3,831,547 A | 8/1974 | Bird | |
| 4,389,199 A * | 6/1983 | Badzinski et al. | ................. 440/74 |
| 4,451,238 A * | 5/1984 | Arnold | ................. 440/75 |

OTHER PUBLICATIONS

Search Report from European Patent Office issued on May 10, 2006 for the corresponding European patent application No. 06250129.1-2422.

* cited by examiner

*Primary Examiner*—Sherry Estremsky
(74) *Attorney, Agent, or Firm*—Posz Law Group, PLC

(57) ABSTRACT

A self-contained marine reversing gear assembly is provided with a locking device for an internal combustion engine in which introduction of the working oil from the lubricating oil circuit is unnecessary. The locking device includes an input shaft driven by an internal combustion engine; an output shaft connected to a propeller shaft; a hydraulic pump driven by the input shaft; a hydraulic forward and reverse clutch; a directional control valve for switching the forward and reverse clutch by the supply of working oil from the hydraulic pump; and a locking device provided with a locking mechanism member for locking the output shaft. The locking device includes a hydraulic actuator for unlocking the output shaft by operating on the locking mechanism member due to the supply of working oil from the hydraulic pump.

6 Claims, 9 Drawing Sheets

MARINE REVERSING GEAR ASSEMBLY PROVIDED WITH LOCKING DEVICE

BACKGROUND OF THE INVENTION

The present invention relates to a marine reversing gear assembly disposed between an internal combustion engine and a propeller shaft. The marine reversing gear assembly transfers the driving power of the internal combustion engine to a propeller by switching the rotation direction forward and backward (reverse) while decelerating.

A ship provided with a marine reversing gear assembly keeps the forward or reverse clutch engaged by supplying working oil to a hydraulic forward or reverse clutch, and rotates a propeller shaft by transferring the torque of the internal combustion engine to the output shaft through the forward or reverse clutch.

When a sail-fitted ship is sailing, its internal combustion engine is stopped. Furthermore, in a ship provided with two engines and two propeller shafts, even if one of the internal combustion engines breaks down, the ship can cruise using the unbroken internal combustion engine. In this case, the propeller rotates while receiving the flow of a stream of water. Since such rotation is transferred to a driven gear or shaft of the marine reduction-reversing gear, a system for supplying lubricating oil becomes necessary. Therefore, equipment that can lock the rotation of a propeller without providing such a system even when the propeller receives the flow of a stream of water is proposed (for example, see U.S. Pat. No. 3,831,447).

Such a locking device is structured so that the locking mechanism member in the locking device that is provided in the reduction-reversing gear is operated by actuating a hydraulic actuator using the pressure of lubricating oil in the lubricating oil pump provided on the internal combustion engine. Therefore, unless both an internal combustion engine and a reduction-reversing gear are provided, connection cannot be obtained between the lubricating oil circuit in the internal combustion engine and the locking mechanism member in the reduction-reversing gear. This limits the order of the steps of attaching the propeller driving parts to the ship. Furthermore, the operability of the locking mechanism member is decreased by resistance in the pipe channel since the length of the pipe channel from the lubricating oil pump to the hydraulic actuator becomes longer.

SUMMARY OF THE INVENTION

An object of the present invention is to provide a self-contained marine reversing gear assembly provided with a locking device in which the introduction of hydraulic pressure from a lubricating oil circuit in an internal combustion engine is unnecessary.

The inventor has conducted extensive research to achieve the above object and accomplished the present invention.

The present invention is a marine reversing gear assembly provided with a locking device. The assembly includes an input shaft driven by an internal combustion engine; an output shaft connected to a propeller shaft; a hydraulic pump driven by the input shaft; a hydraulic forward and reverse clutch; a directional control valve for switching the forward or reverse clutch by the supply of working oil from the hydraulic pump; and a locking device provided with a locking mechanism member for locking the output shaft, and a hydraulic actuator for unlocking the output shaft by operating on the locking mechanism member due to the supply of working oil from the hydraulic pump.

The locking mechanism member includes a locked part, a locking part that can freely lock or unlock the locked part, and an elastic body for energizing the locking part in the locking direction, the hydraulic actuator being designed so as to detach the locking part from the locked part against the energizing force applied by the elastic body, the locked part being dismountably disposed on a boss of a coupling disposed on the end of the output shaft for coupling the output shaft with a propeller shaft, and the locking part and the hydraulic actuator being dismountably disposed in the vicinity of the output shaft on the external surface of a housing that supports the output shaft.

The locking mechanism member includes a slide member that is equipped with a locked part and attached to the output shaft by a spline fitting so as to be slidable in the axial direction, a locking part for locking the locked part, and an elastic body for energizing the locking part in the locking direction.

The hydraulic actuator is designed to detach the slide member from the locking part against the energizing force applied by the elastic body; and The locking part is located inside a housing that supports the output shaft.

The locked part is structured so as to be stopped by the frictional engagement between the locking part and the locked part.

The marine reversing gear assembly includes an oil supply circuit provided with the hydraulic pump, the forward and reverse clutch, the directional control valve, and the hydraulic actuator, wherein the hydraulic actuator is disposed upstream of the directional control valve in the oil supply circuit.

In the marine reversing gear assembly provided with a locking device of the present invention, the locking device of the output shaft is structured so that the output shaft is unlocked by the hydraulic actuator operating on the locking mechanism member by supplying working oil for the forward or reverse clutch from the hydraulic pump disposed in the reduction-reversing gear. Therefore, the locking mechanism member can be actuated without introducing working oil from the lubricating oil circuit of the internal combustion engine, thus resulting in a self-contained reduction-reversing gear provided with a locking device. This simplifies installation of a power unit, such as an internal combustion engine, reduction-reversing gear, etc., in a ship hull, and improves the efficiency of the installation operation. Furthermore, because the reduction-reversing gear is self-contained, the pipe channel from the hydraulic pump to the hydraulic actuator can be shortened to prevent decrease in the operability of the locking mechanism member due to resistance in the pipe channel.

The locking mechanism member of the present invention is designed so as to comprise a locked part, a locking part that can freely lock or unlock the locked part, and an elastic body for energizing the locking part in the engaging direction; the hydraulic actuator being designed so as to detach the locking part from the locked part against the energizing force applied by the elastic body; the locked part being dismountably disposed on a boss of a coupling disposed on the end of the output shaft for coupling the output shaft with a propeller shaft; and the locking part and the hydraulic actuator being dismountably disposed in the vicinity of the output shaft on the external surface of a housing that supports the output shaft. This makes it possible to retrofit the locking device, and it is unnecessary to change the size of the connecting portions between the internal combustion engine and the input shaft of the reduction-reversing gear and between the propeller shaft and the output shaft of the reduction-reversing gear for installing the locking device. This allows the locking device to be an optional device depending on the specifications of the ship provided with the marine reduction-reversing gear, such as whether or not the ship can operate under sail, whether or not the ship comprises two engines and two propeller shafts, etc.

The marine reversing gear assembly provided with a locking device of the present invention comprises an oil supply circuit provided with a hydraulic pump, a forward and reverse clutch, a directional control valve, and a hydraulic actuator, wherein the hydraulic actuator is disposed upstream of the directional control valve in the oil supply circuit. This arrangement makes it possible to supply high-pressure oil to the forward or reverse clutch before adjusting the pressure for use as a working oil for the hydraulic actuator, and therefore unlocking can be conducted quickly.

DETAILED DESCRIPTION OF THE PREFERRED EMBODIMENTS

Figure 1:
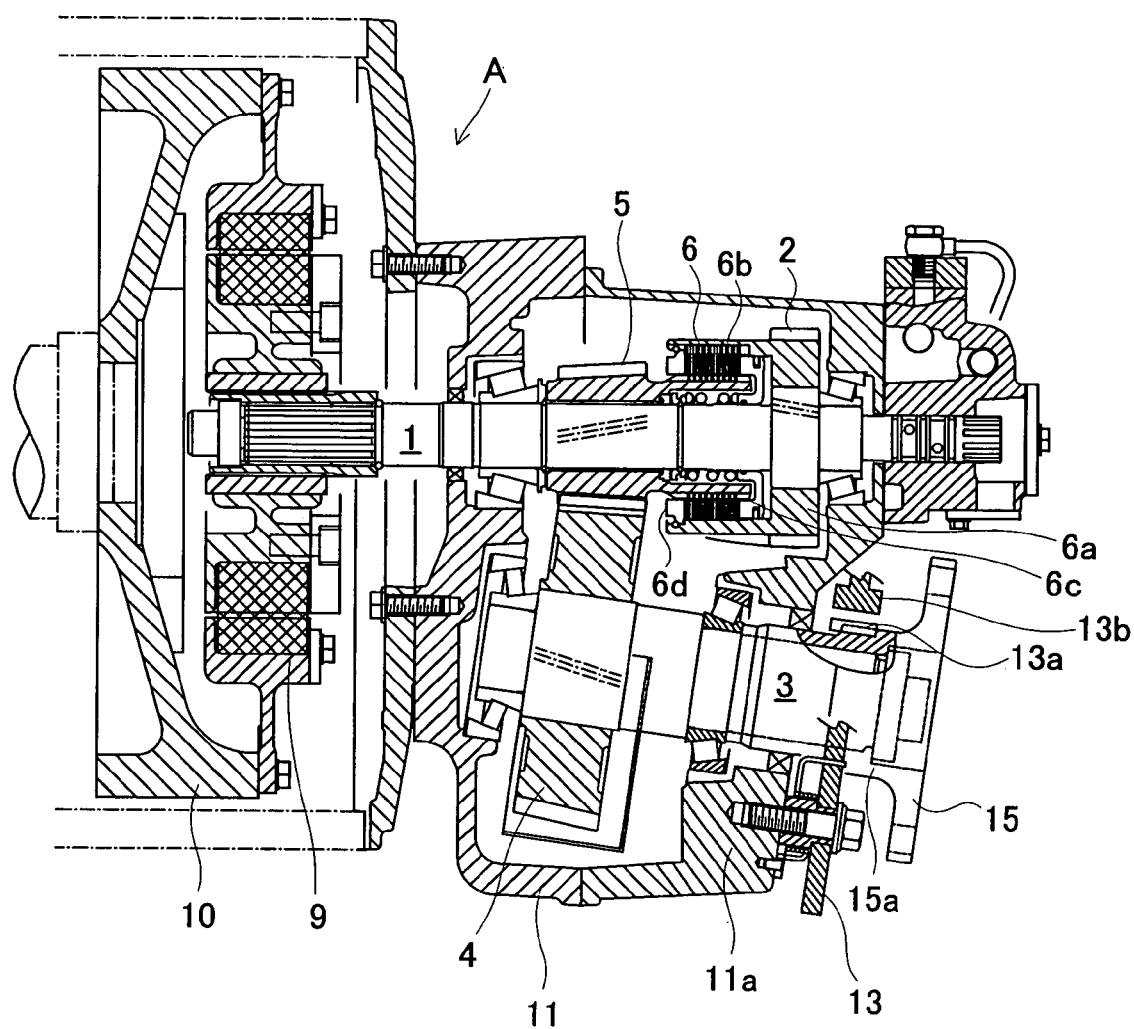
FIG. 1 shows a cross-sectional view of one embodiment of a marine reversing gear assembly provided with a locking device.

As shown in FIG. 1, the marine reversing gear assembly of the present invention comprises an input shaft 1 driven by an internal combustion engine (not shown), an input gear 2 provided on the input shaft 1, an output shaft 3 connected to a propeller shaft, an output gear 4 fixed to the output shaft 3, a forward pinion 5 that is loosely fitted to the input shaft 1 and that engages with the output gear 4, a hydraulic forward clutch 6 for coupling the forward pinion 5 to the input shaft 1, a reverse shaft (not shown) for rotating the output shaft 3 backward, a reverse pinion (not shown) that is loosely fitted to the reverse shaft and that engages with the output gear 4, a hydraulic reverse clutch 7 (see FIG. 5) for coupling the forward pinion 5 to the reverse shaft, an oil supply circuit 8 for switching to the forward clutch 6 or reverse clutch 7, and a hydraulic pump P driven by the input shaft 1.

The forward clutch 6 comprises a tubular clutch housing 6a with a bottom having an input gear 2 around the external surface thereof, a multiple disc clutch plate 6b, and a presser plate 6c, wherein the forward pinion 5 to which one end of the input shaft 1 is attached projects into the clutch housing 6a. The multiple disc clutch plates 6b are disposed alternatively on the external surface of the forward pinion 5 and the inner surface of the clutch housing 6a. In the clutch housing 6a, a hydraulic piston 6d to which working oil is supplied from the hydraulic pump P, which is driven by the input shaft 1, is inserted. The pushing action of the hydraulic piston 6d presses the multiple disc clutch plate 6b onto the presser plate 6c and the hydraulic piston 6d while being sandwiched therebetween. In the figure, 9 is an elastic coupling and 10 is a flywheel.

When the forward clutch 6 is engaged, the forward pinion 5 is connected to the input gear 2, and therefore the input shaft 1 and the forward pinion 5 are connected. When the forward clutch 6 is disengaged, the forward pinion 5 is disconnected from the input shaft 1, and therefore the forward pinion 5 runs idle relative to the input shaft 1.

The reverse clutch 7 comprises a reverse gear, a tubular clutch housing with a bottom, a multiple disc clutch plate, a presser plate, and a hydraulic piston (all components are not shown), wherein the reverse gear engages with the input gear 2.

During forward movement, the reverse clutch 7 is in the OFF position. The reverse shaft and the reverse gear run idle because the reverse pinion and the reverse shaft are disconnected. During reverse movement, the reverse clutch 7 is in the ON position (the forward clutch 6 is in the OFF position). Under this condition, the reverse pinion is coupled with the reverse shaft, and the output gear 4 is reversed by the reverse pinion.

Figure 2:
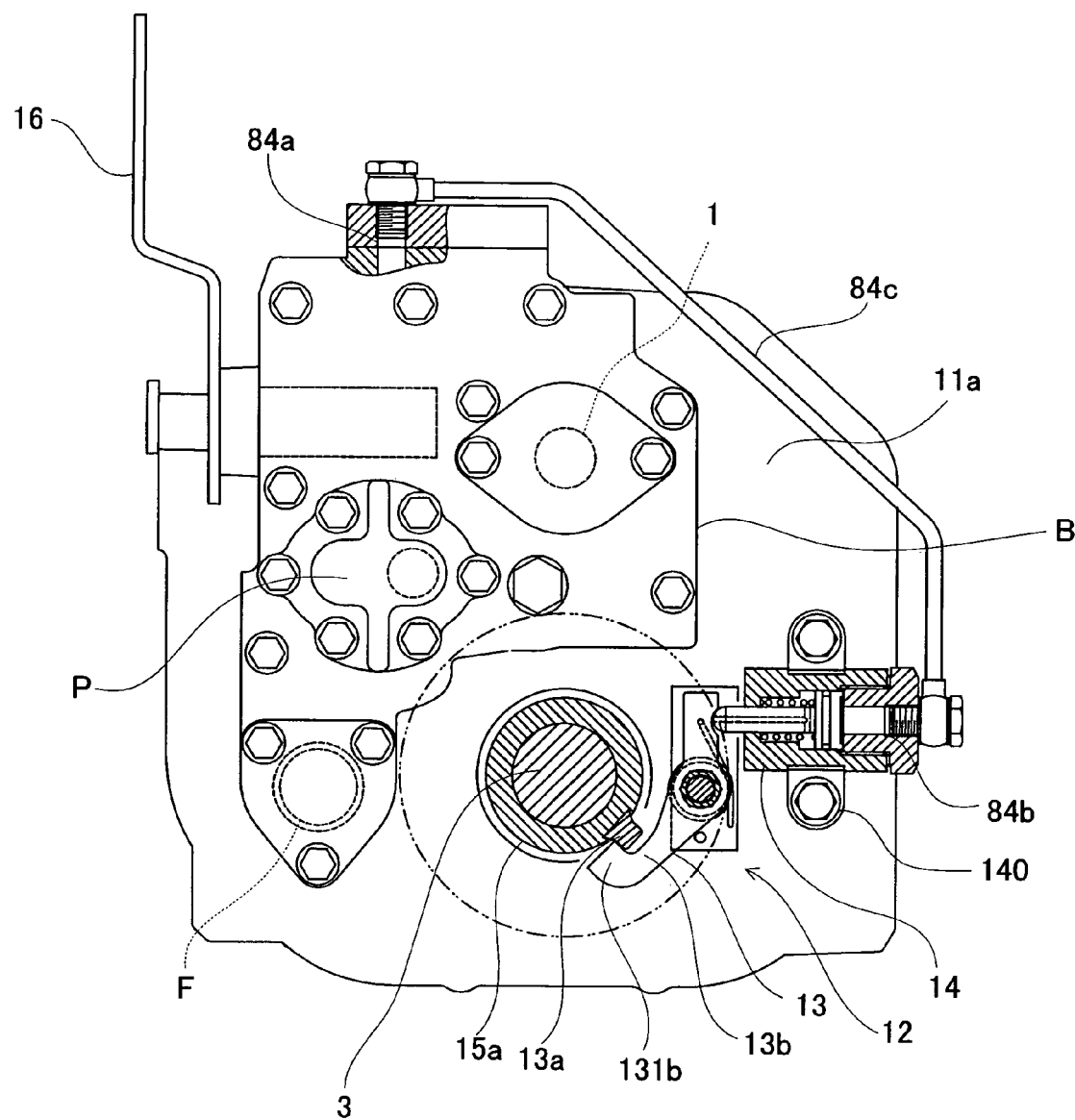
FIG. 2 is a partial side elevational view of the embodiment of FIG. 1.

As shown in FIG. 2, a rear housing 11a in a housing 11 of the reduction-reversing gear supports an input shaft 1, an output shaft 3, and the reverse shaft. A hydraulic pump P, an oil filter F, and a hydraulic block B having an oil supply circuit 8 therein are provided on the upper portion of the external surface of the output shaft 3.

Furthermore, the marine reversing gear assembly comprises a locking device 12 of the output shaft 3. The locking device 12 comprises a locking mechanism member 13, and a hydraulic unlocking cylinder 14 (one example of a hydraulic actuator) for unlocking the output shaft 3.

Figure 3:
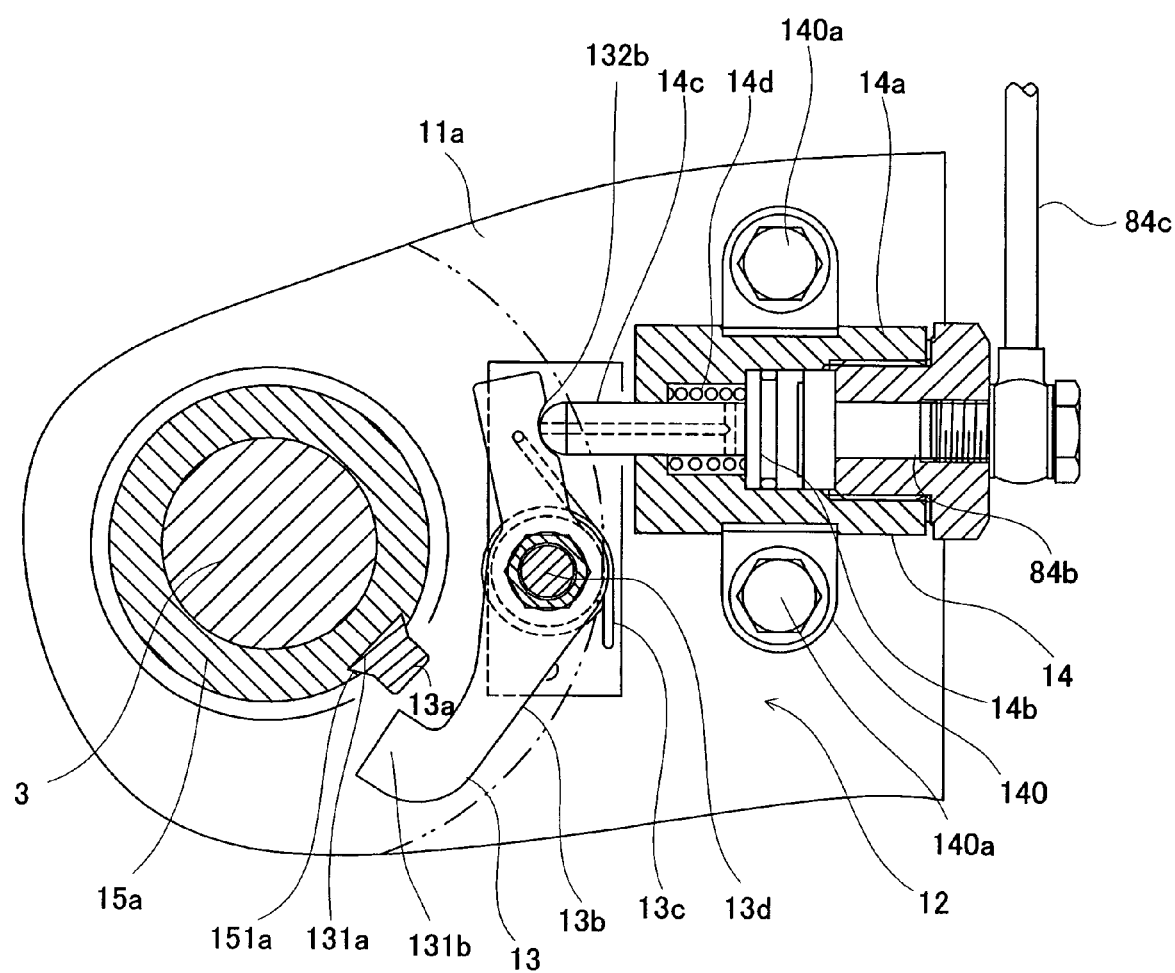
FIG. 3 is an enlarged partial side elevational view of the locking device of the embodiment.

As shown in FIG. 3, the locking mechanism member 13 comprises a locked part 13a, a locking part 13b that can freely lock or unlock the locked part 13a, and a locking spring 13c (one example of an elastic body), which is a torsion spring that energizes the locking part 13b in the engaging direction.

The locked part 13a is disposed on a boss 15a of a coupling 15 on the end of the output shaft 3 for coupling the output shaft with a propeller shaft. In other words, a dovetail groove portion 151a is formed in a boss 15a of a coupling 15, and a dovetail tenon portion 131a formed below the locked part 13a is fitted in the dovetail groove portion 151a.

Figure 4:
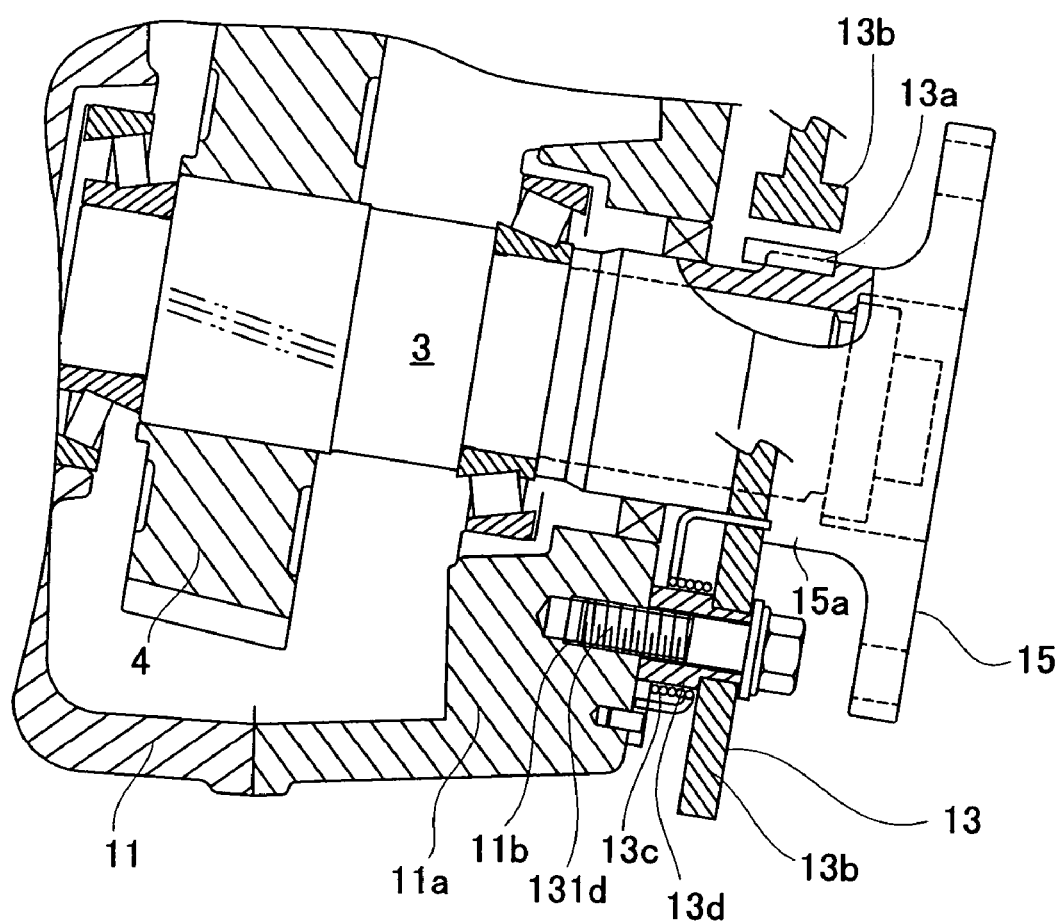
FIG. 4 is an enlarged cross-sectional view of the locking device of the embodiment.

The locking part 13b is swingably supported by a shaft 13d. A hooking portion 131b is formed on one end of the locking part 13b, and a portion 132b for receiving an operating part of the unlocking cylinder 14 is formed on the other end. The hooking portion 131b is energized by a locking spring 13c provided around the shaft 13d so as to rotate in the direction that causes the hooking portion 131b to engage with the locked part 13a, so that the output shaft 3 is locked by the engagement of the hooking portion 131b of the locking part 13b with the locked part 13a. The shaft 13d is provided with a male screw 131d, and by screwing the male screw 131d in a screw hole 11b formed in a housing 11, the locking part 13b is dismountably attached to the housing 11 by the shaft 13d (see FIG. 4).

The unlocking cylinder 14 comprises a cylinder body 14a, a piston 14b that reciprocates in the cylinder body 14a, a rod-shaped operating part 14c that extends from or retracts into the cylinder body 14a, and a compression spring 14d for retracting the operating part 14c. The operating part 14c is retracted by the compression spring 14d to detach it from the locking part 13b, locking the output shaft 3. If the energizing force of the locking spring 13c is strong enough to retract the operating part 14c, the compression spring 14d may be omitted.

The unlocking cylinder 14 is held by a fastening band 140 and dismountably attached to the output shaft 3 side of the external surface of the rear housing 11a by fastening bolts 140a disposed on both ends of the fastening band 140.

Figure 5:
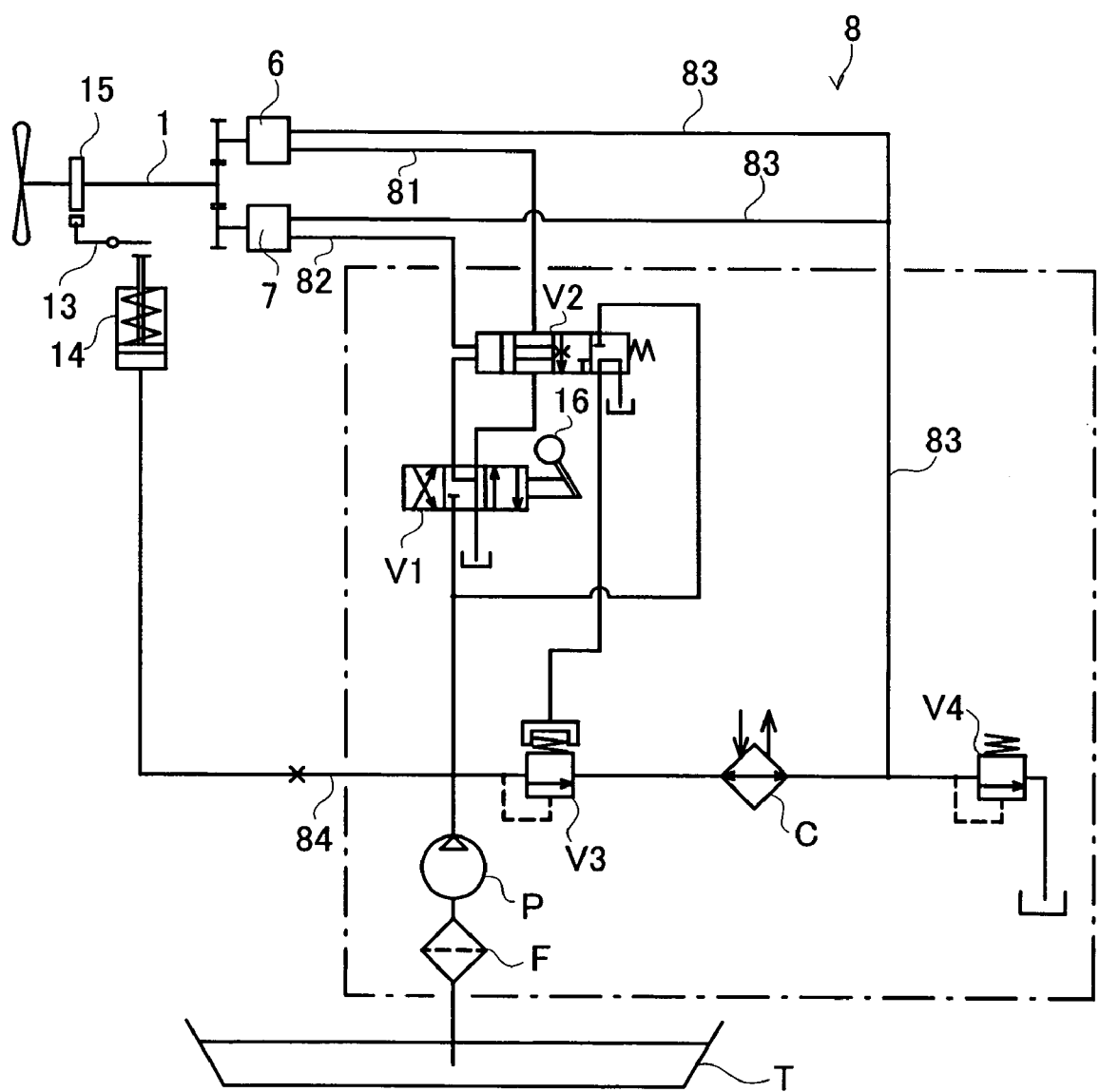
FIG. 5 shows the oil supply circuit of the embodiment.

FIG. 5 shows the oil supply circuit 8, wherein the oil supply circuit 8 comprises an oil tank T, a filter F, a hydraulic pump P, a directional control valve V1 provided with a switching lever 16, a 3-position valve V2, a clutch oil pressure control valve V3, and an unlocking cylinder 14, wherein the directional control valve V1 is operated by the working oil from the hydraulic pump P, and the forward clutch 6 or the reverse clutch 7 is engaged by switching the supply of working oil from the hydraulic pump P to a forward oil path 81 or a reverse oil path 82. The oil supply circuit 8 further comprises a lubricating oil circuit 83, a lubricating oil pressure relief valve V4, and an oil cooler C. Note that the 3-position valve V2 is designed so that the oil pressure in the forward oil path 81 and the reverse oil path 82 can function as a pilot pressure. The clutch oil pressure control valve V3 prevents the forward clutch 6 or reverse clutch 7 from rapidly being engaged when the clutch is switched by the directional control valve V1.

In the oil supply circuit 8, an unlocking oil circuit 84 for supplying working oil to the unlocking cylinder 14 is branched from the middle of the oil path between the hydraulic pump P and the directional control valve V1 so that the working oil is supplied to the unlocking cylinder 14 through the unlocking oil circuit 84. As shown in FIG. 2, the unlocking oil circuit 84 comprises a hydraulic output port 84a that opens on top of the hydraulic block B, a hydraulic inlet port 84b that is disposed on the unlocking cylinder 14 side, and an oil path pipe 84c that is dismountably attached to the ports 84a and 84b.

In such a reduction-reversing gear provided with a locking device 12, when the internal combustion engine is halted, the hydraulic pump P is also halted and oil supply to the unlocking cylinder 14 stops. Therefore, the hooking portion 131b of the locking part 13b becomes engaged with the locked part 13a due to the energizing force of the locking spring 13c of the locking mechanism member 12, locking the output shaft 3. In contrast, by operating the internal combustion engine, working oil is supplied from the hydraulic pump P through the unlocking oil circuit 84 to the unlocking cylinder 14. Thereby, the operating part 14c of the unlocking cylinder 14 extends, the receiving portion 132b of the locking part 13b is pressed against the energizing force of the locking spring 13c, and the hooking portion 131b of the locking part 13b is rotated in the direction wherein it detaches from the locked part 13a, thus resulting in unlocking the output shaft 3.

Figure 6:
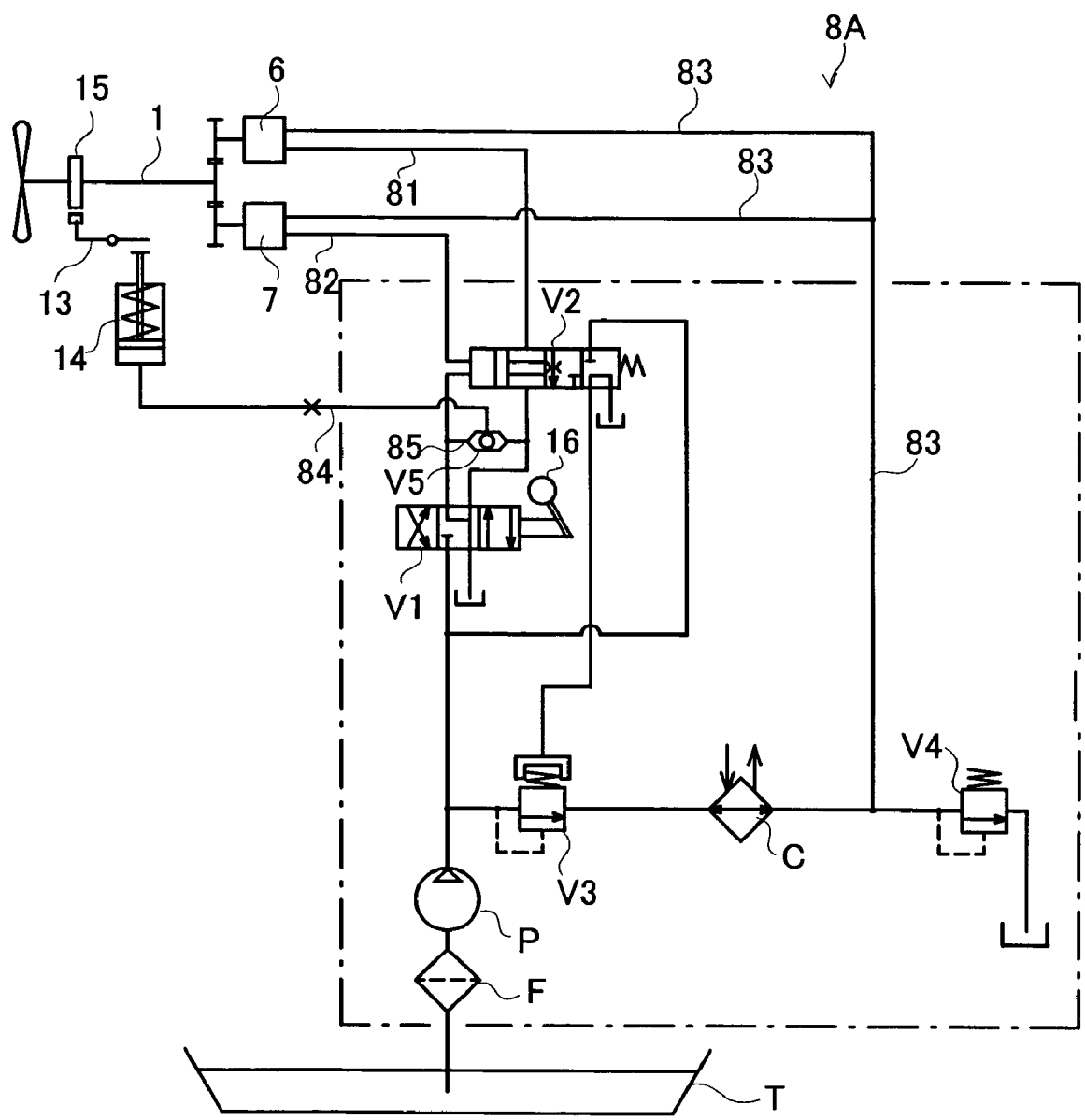
FIG. 6 shows another example of the oil supply circuit.

FIG. 6 shows another example of oil supply circuit 8A, in which an unlocking oil circuit 84 is derived from a shuttle valve V5 disposed downstream from the directional control valve V1 and that is provided on the oil path 85 connecting the forward oil path with the reverse oil path. Therefore, immediately after the start of the internal combustion engine, the output shaft 3 is not unlocked, and when the directional control valve V1 is switched to forward or reverse, working oil is supplied to the unlocking cylinder 14 through the unlocking oil circuit 84 to unlock the output shaft 3.

Figure 7:
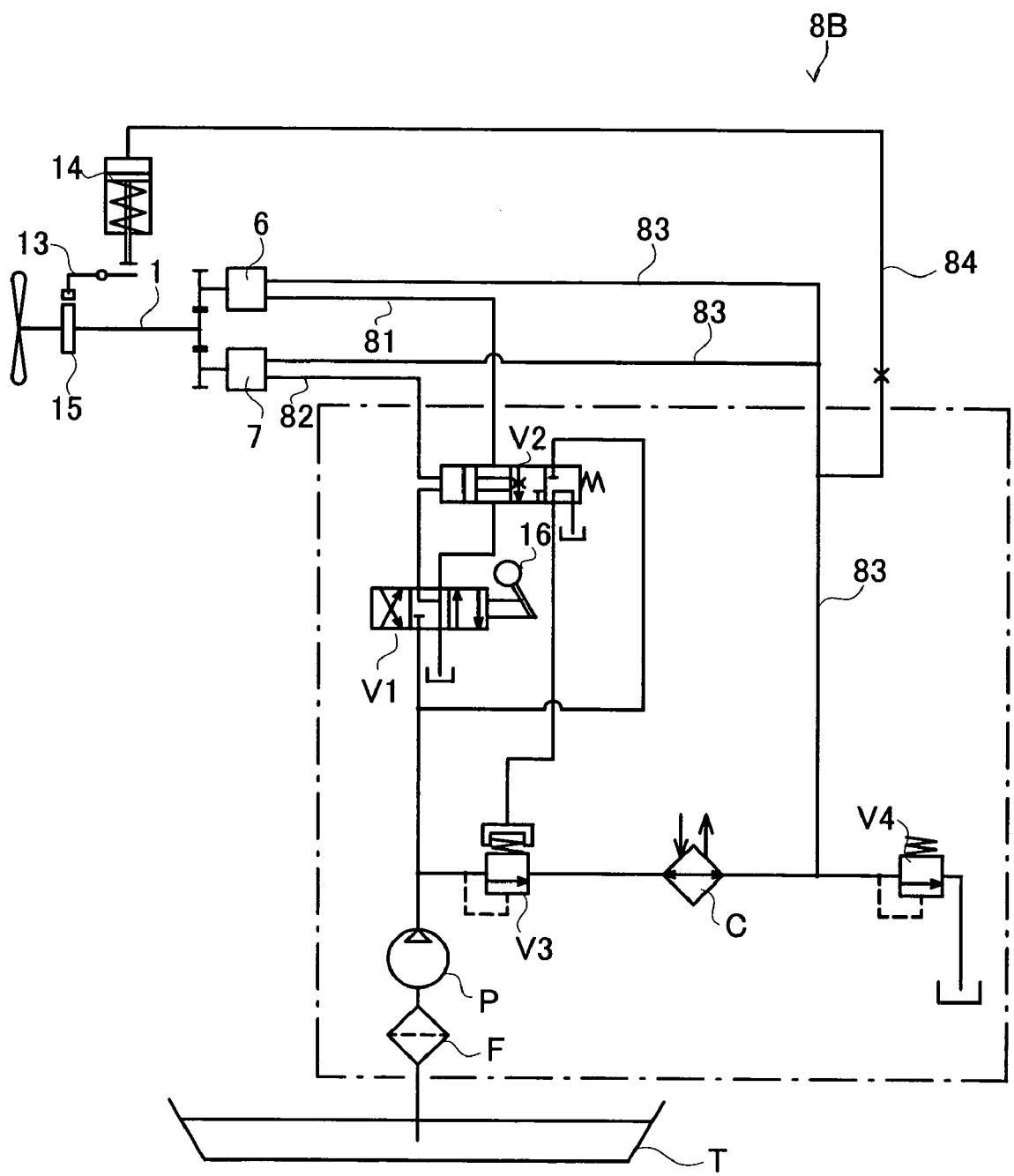
FIG. 7 shows still another example of the oil supply circuit.

FIG. 7 illustrates still another example of oil supply circuit 8B, wherein the unlocking cylinder 14 is operated due to the pressure of the lubricating oil by branching the unlocking oil circuit 84 from the lubricating oil circuit 83.

An embodiment of the present invention is explained above; however, the present invention is not limited to this embodiment and various modifications may be made as long as they do not adversely affect the effects of the present invention.

Figure 8:
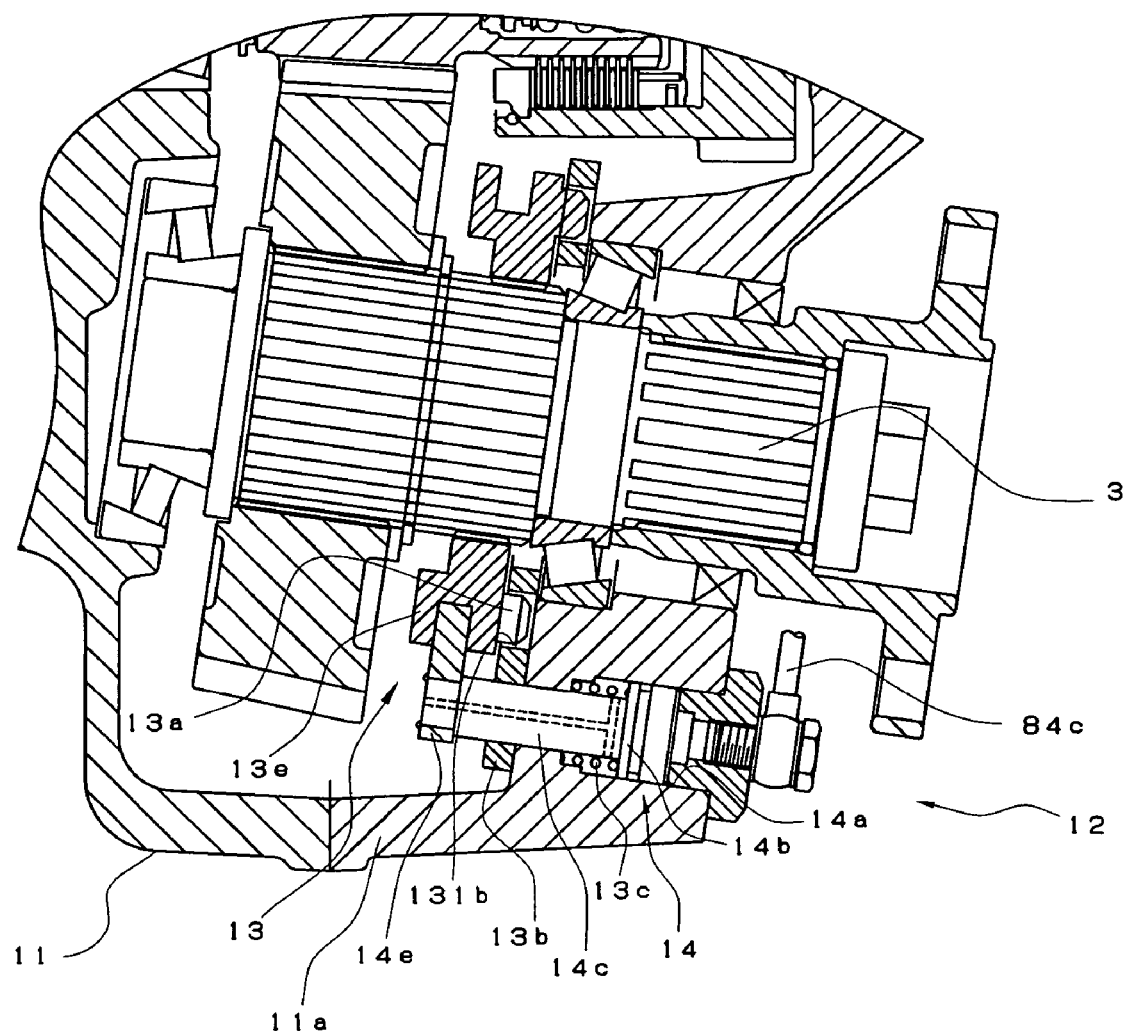
FIG. 8 is an enlarged cross-sectional view of the locking device of another embodiment.

For example, in the above embodiment, the locking mechanism member 13 is disposed on the external surface of the housing 11; however, the locking mechanism member 13 may be disposed inside the housing 11 as shown in FIG. 8. The locking mechanism member 13 comprises a slide member 13e provided with a projection 13a that serves as a locked part, a locking part 13b that interlocks with the projection 13a, and a compression spring 13c, which is an elastic body. The locking part 13b in this embodiment has a plate-like form, comprises a hole 131b in which the projection 13a fits, and is non-rotatably attached to the inner surface of the rear housing 11a.

A hydraulic unlocking cylinder 14 comprises a housing body 14a that is configured by forming a concave portion in the rear housing 11a, a piston 14b that reciprocates in the cylinder body 14a, and a rod-shaped operating part 14c that extends from the cylinder body 14a toward the inside of the housing 11 so as to pass through the cylinder body 14a. A coupling member 14e is provided on the operating part 14c for coupling the operating part 14c to the slide member 13e. This makes the operating part 14c and the slide member 13e operate together.

In such a locking device 12, when the internal combustion engine is halted, the oil supply to the unlocking cylinder 14 stops, and the operating part 14c moves in the retracting direction by the energizing force of the compression spring 13c. In this structure, the slide member 13e moves together with the operating part 14c, and therefore the projection 13a serving as a locked part engages in a hole 131b in the locking part 13b so that the output shaft 3 is locked. In contrast, by operating the internal combustion engine, working oil is supplied from the oil path pipe 84c to the unlocking cylinder 14. Thereby, the operating part 14c extends against the energizing force of the compression spring 13c. In this structure, because the slide member 13e moves together with the operating part 14c, the projection 13a comes out of the hole 131b, thus unlocking the output shaft 3.

Figure 9:
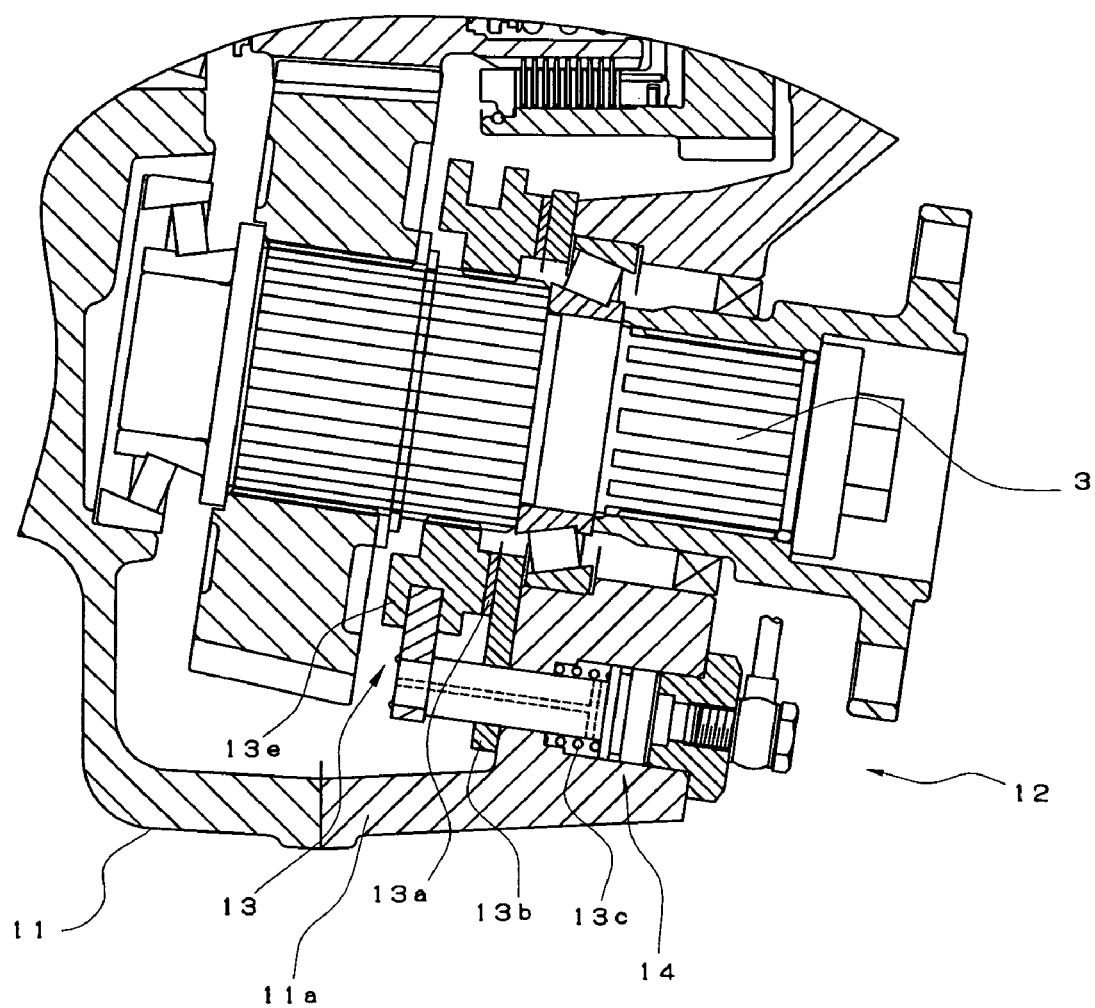
FIG. 9 is an enlarged cross-sectional view of the locking device of still another embodiment.

It is also possible to provide a friction material on the slide member 13e in the portion which contacts the locking part 13b, as shown in FIG. 9, instead of providing a projection that serves as a locked part. In this case, it is unnecessary to provide a hole in the locking part 13b. The energizing force of the compression spring 13c is suitably set at the level such that the friction material 13a serving as a locked part is stopped by the frictional engagement between the friction material 13a and the locking part 13b when the oil supply to the unlocking cylinder 14 stops. This structure makes it possible to lock the output shaft 3 not rapidly but gradually when the internal combustion engine is halted by making the friction material 13a and the locking part 13b slide on each other. Instead of attaching the friction material, it is also possible to achieve the same effect by providing a multi disc-type friction plate wherein the discs are laminated in the axial direction onto each of the output shaft 3 and the rear housing 11a.

As described above, by providing the locking mechanism member 13 inside the housing 11, the durability of the locking device 12 can be enhanced, because such a locking device 12 is unaffected by the conditions outside the housing 11. This makes the operation of the locking device 12 stable and enhances its reliability.

REFERENCE CHARACTERS 1 input shaft
3 output shaft
6 forward clutch
7 reverse clutch
11 housing
11a rear housing
12 locking device of the output shaft
13 locking mechanism member
14 unlocking cylinder
P hydraulic pump

The invention claimed is:

1. A marine reversing gear assembly provided with a locking device comprising:
   an input shaft driven by an internal combustion engine;
   an output shaft connected to a propeller shaft;
   a hydraulic pump driven by the input shaft;
   a hydraulic forward and reverse clutch;
   a directional control valve for switching the forward or reverse clutch by the supply of working oil from the hydraulic pump; and
   a locking device provided with a locking mechanism for locking the output shaft, and a hydraulic actuator for unlocking the output shaft by operating on the locking mechanism due to the supply of working oil from the hydraulic pump, wherein the locking mechanism includes a locking part and a locked part, which are constructed to enter into an engaged locking position when pressure of the working oil falls to a relatively low pressure, so that rotation of the output shaft is blocked immediately when the locking part and the locked part enter into the engaged locking position.

2. A marine reversing gear assembly provided with a locking device according to claim 1, wherein
   the locking mechanism comprises a slide member, which is equipped with the locked part and is attached to the output shaft by a spline fitting so as to be slidable in the axial direction of the output shaft, and an elastic body for applying a force to the locking part in a locking direction;
   the hydraulic actuator is constructed to detach the slide member from the locking part against the force applied by the elastic body; and
   the locking part is located inside a housing that supports the output shaft.

3. A marine reversing gear assembly provided with a locking device according to claim 1, wherein the hydraulic pump, the forward and reverse clutch, the directional control valve, and the hydraulic actuator, are located in an oil supply circuit, and the hydraulic actuator is supplied with oil from the oil supply circuit at a point upstream of the directional control valve in the oil supply circuit.

4. A marine reversing gear assembly provided with a locking device according to claim 1, wherein the locked part and the locking part face one another in a direction that is tangential to the output shaft when engaged.

5. A marine reversing gear assembly provided with a locking device comprising:
   an input shaft driven by an internal combustion engine;
   an output shaft connected to a propeller shaft;
   a hydraulic pump driven by the input shaft;
   a hydraulic forward and reverse clutch;
   a directional control valve for switching the forward or reverse clutch by the supply of working oil from the hydraulic pump;
   a locking device provided with a locking mechanism for locking the output shaft, and a hydraulic actuator for unlocking the output shaft by operating on the locking mechanism due to the supply of working oil from the hydraulic pump, wherein
   the locking mechanism comprises a locked part, a locking part that can freely lock or unlock the locked part, and an elastic body for applying a force to the locking part in a locking direction;
   the hydraulic actuator is constructed to disengage the locking part from the locked part against the force applied by the elastic body;
   the locked part is joined to a boss of a coupling, which is located on one end of the output shaft, and the boss is for coupling the output shaft with a propeller shaft; and
   the locking part and the hydraulic actuator are detachably fixed in the vicinity of the output shaft on the external surface of a housing that supports the output shaft.

6. The marine reversing gear assembly according to claim 5, wherein the hydraulic pump, the forward and reverse clutch, the directional control valve, and the hydraulic actuator, are located in an oil supply circuit, and the hydraulic actuator is supplied with oil from the oil supply circuit at a point upstream of the directional control valve in the oil supply circuit.

* * * * *